United States Patent [19]

Okoyama

[11] Patent Number: 5,400,097
[45] Date of Patent: Mar. 21, 1995

[54] LENS-FITTED PHOTOGRAPHIC FILM UNIT FOR TAKING PLURAL SIMULTANEOUS EXPOSURES

[75] Inventor: Kazuo Okoyama, Saitama, Japan

[73] Assignee: Fuji Photo Film Co., Ltd., Kanagawa, Japan

[21] Appl. No.: 194,386

[22] Filed: Feb. 10, 1994

[30] Foreign Application Priority Data

Feb. 19, 1993 [JP] Japan ............................ 5-022884
Mar. 1, 1993 [JP] Japan ............................ 5-040197

[51] Int. Cl.⁶ .............................................. G03B 35/08
[52] U.S. Cl. ..................................... 354/120; 354/195.12
[58] Field of Search ............ 354/110, 114, 118, 120, 354/195.12, 245, 248

[56] References Cited

U.S. PATENT DOCUMENTS

| | | | |
|---|---|---|---|
| 3,069,987 | 12/1962 | Harrington | 354/120 |
| 3,563,637 | 2/1971 | Ferguson | 354/195.12 X |
| 4,564,278 | 1/1986 | Ohmura | 354/195.12 |
| 4,589,748 | 5/1986 | Ohmura | 354/195.12 |
| 4,884,087 | 11/1989 | Mochida et al. | 354/75 |
| 4,972,649 | 11/1990 | Mochida et al. | 53/430 |
| 5,047,792 | 9/1991 | Asano et al. | 354/195.12 X |
| 5,111,223 | 5/1992 | Omura | 354/195.12 X |

Primary Examiner—Michael L. Gellner
Assistant Examiner—J. K. Han
Attorney, Agent, or Firm—Young & Thompson

[57] ABSTRACT

A lens-fitted photographic film unit is pre-loaded with photographic film. First and second stationary openings are formed respectively in front of first and second exposure chambers. A wide-angle taking lens is disposed in front of the first stationary opening, and has a shorter focal length. A telephoto taking lens is disposed in front of the second stationary opening, and has a longer focal length. In response to operation of a shutter release button, a single shutter plate slides horizontally. Wide-angle and telephoto movable openings are formed in the shutter plate and are registrable with the respective stationary openings. The telephoto movable opening is different in size from the wide-angle movable opening. When the shutter plate is slid, the movable openings open or close the stationary openings simultaneously, and expose the film to make two simultaneous exposures. In a preferred embodiment, the wide-angle lens is disposed behind the shutter plate. A transparent lens plate is disposed in front of the shutter plate to cover the shutter plate, and is provided with the telephoto lens.

9 Claims, 7 Drawing Sheets

LENS-FITTED PHOTOGRAPHIC FILM UNIT FOR TAKING PLURAL SIMULTANEOUS EXPOSURES

BACKGROUND OF THE INVENTION

1. Field of the Invention

The present invention relates to a lens-fitted photographic film unit. More particularly the present invention relates to a lens-fitted photographic film unit in which, upon a single shutter release, plural exposures are simultaneously taken on a photographic film.

2. Description of the Prior Art

Known lens-fitted photographic film units (hereinafter referred to simply as film units) are disclosed U.S. Pat. Nos. 4,884,087 and 4,972,649, and are now on the market, e.g. under the trademark "Fujicolor Quick Snap" (manufactured by Fuji Photo Film Co., Ltd.). Such film units are a single-use camera pre-loaded with photograph filmstrip (hereinafter referred to as film). A user who has purchased the film unit winds the film frame by frame back into a cassette after each exposure. The film unit in its entirety is forwarded to a photographic laboratory after exposure of all the frames of the film.

The film unit is sold at a low price as compared with the usual cameras. There have been a number of different variants of commercially available film units, such as a built-in flash type, a panoramic type, a telephotographic type, and a type changeable for close-up photography.

It is conceivable to design a film unit in which two taking lenses are mounted and are different as to focal length, and in which two exposures are simultaneously taken to create imaging frames on film, respectively in telephotographic and wide-angle fashions, upon a single operation of releasing a shutter device. A single shutter plate is also conceivable for the operation of opening or closing respective photographing systems associated with the telephoto and wide-angle lenses, and if it were possible to use such a shutter plate, this might be advantageous because of the low cost and simple processes for manufacturing the same.

Such single shutter plate would have two movable openings, each respectively associated with one of the photographing systems. The shutter speed, which is to say the exposure time, is equal for the two systems because the single shutter plate is moved at a speed common to both of the photographing systems. However, the lenses differ as to focal length and also as to f-number or aperture stop, when the associated stationary openings have a similar size. Should the shutter speed be determined to be suitable for one of the photographing systems, the shutter speed will be either too high or too low for the other photographing system. The common shutter speed will be too high for a high f-number, and so will cause an under-exposed condition of an imaging frame. Otherwise the common shutter speed will be too low for a low f-number, and will cause an over-exposed condition.

OBJECTS OF THE INVENTION

In view of the foregoing problems, an object of the present invention is to provide a lens-fitted photographic film unit in which a plurality of exposures are simultaneously taken with good balance between the exposures.

Another object of the present invention is to provide a lens-fitted photographic film unit in which a shutter member, for taking a plurality of exposures simultaneously, can be protected reliably from external shocks or dirt.

SUMMARY OF THE INVENTION

In order to achieve the above and other objects and advantages of this invention, a lens-fitted photographic film unit is pre-loaded with photographic film, provided with first and second exposure chambers, and adapted to create first and second imaging frames simultaneously on the film. First and second stationary openings are formed respectively in front of the first and second exposure chambers for introducing light into the first and second exposure chambers. A first taking lens is associated with the first stationary opening and has a first focal length. A second taking lens is associated with the second Stationary opening and has a second focal length longer than the first focal length.

A shutter release means is externally operable. A single shutter plate is disposed to be moved in response to operation of the release means. First and second movable openings are formed in the shutter plate and respectively associated with the first and second stationary openings. When the shutter plate is moved, the movable openings are moved to open and then close the stationary openings simultaneously so as to expose the film. The second movable opening is larger than the first movable opening.

The exposure times, which is to say the shutter speeds, can be determined so as to be suitable for two photographing systems. Even with the two taking lenses different in f-number, the shutter speeds will be adequate for both photographing systems. The two exposures are simultaneously taken under well-balanced conditions of exposure. Imaging frames never involve any problem of an under-exposed or over-exposed condition.

In a preferred embodiment, a transparent lens plate is disposed in front of the shutter plate to cover the shutter plate, and this lens plate is provided with the second lens. The first lens is disposed behind the shutter plate. The shutter plate, for taking a plurality of exposures simultaneously, can be protected reliably from external shocks or dirt.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE PREFERRED EMBODIMENTS OF THE INVENTION

Figure 1:
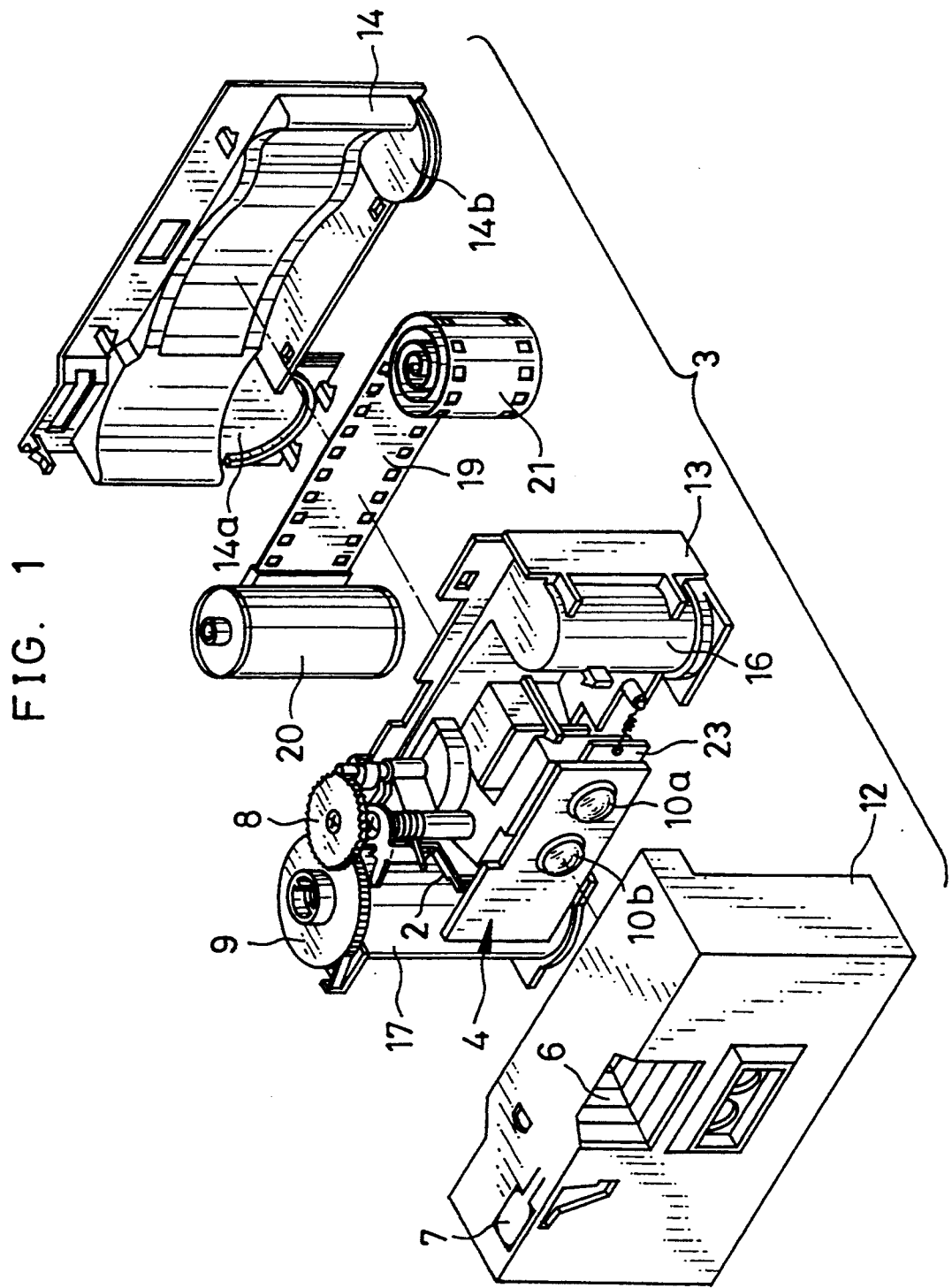
FIG. 1 is an exploded perspective view illustrating a photographic film unit according to the present invention.

As shown in FIG. 1, which illustrates a novel lens-fitted photographic film unit, a photographic film housing 3 has a main body 13, and front and rear covers 12 and 14 secured to the main body 13 in retention by the use of claws. The film housing 3 includes an exposure section 4. A viewfinder window 6 is formed through the photo film housing 3. There are formed openings in the front cover 12 for allowing external access to a pair of taking lenses 10a and 10b, a counter wheel 8, and a film winding wheel 9. A depressible portion 7 for use as a release button is formed on the front cover 12.

The main body 13 has the exposure section 4 on which the taking lenses 10a and 10b are mounted, and includes a cassette-containing chamber 17 and a photographic film supply chamber 16 on respective lateral sides. The cassette-containing chamber 17 contains a cassette 20. The supply chamber 16 contains a roll 21 of the photographic film 19, which has been fully drawn out of the cassette 20.

On the rear cover 14 are formed two bottom lids 14a and 14b, which respectively cover the bottoms of the cassette-containing chamber 17 and the supply chamber 16 in light-tight fashion.

Figure 2:
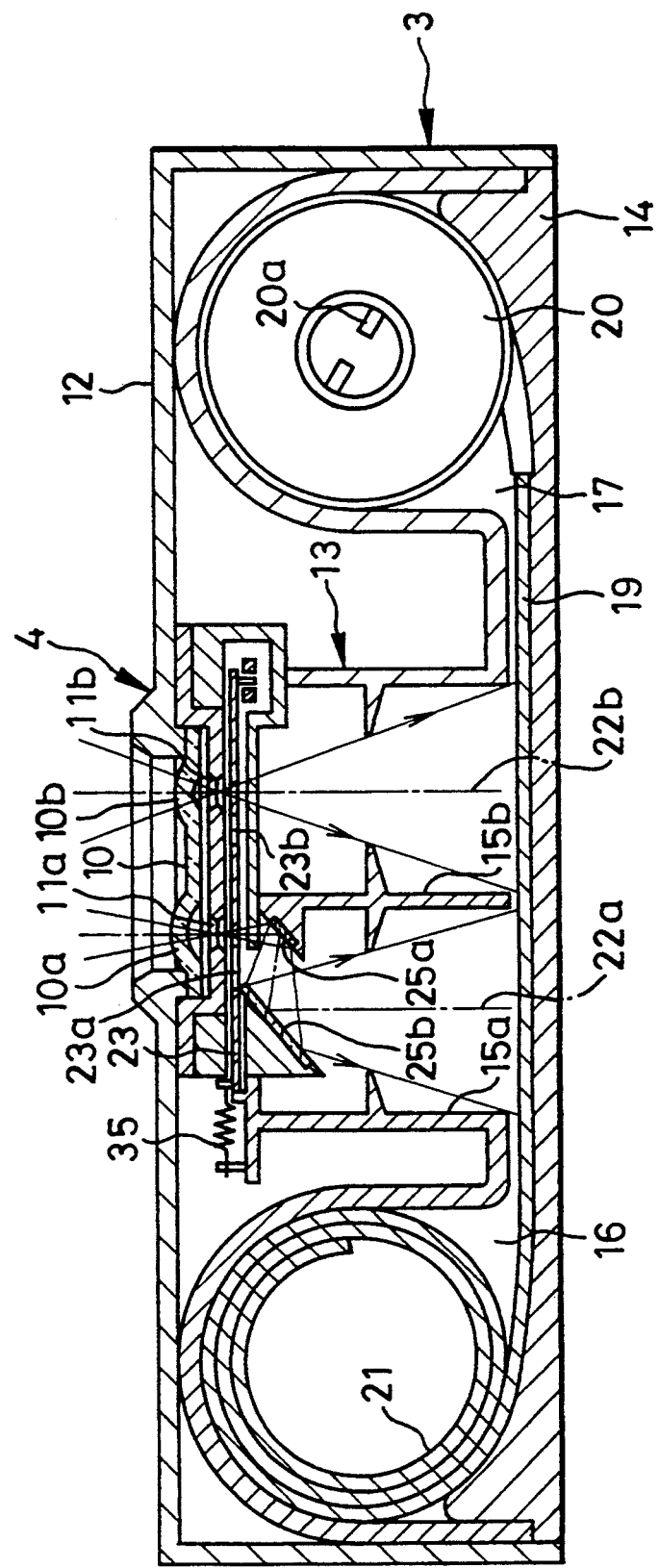
FIG. 2 is a horizontal section illustrating the film unit of FIG. 1.

In FIG. 2 showing the film unit in section, the main body 13 has two exposure chambers 15a and 15b formed between the cassette-containing chamber 17 and the supply chamber 16. In the cassette-containing chamber 17, a spool 20a mounted in the cassette 20 is coupled with the winding wheel 9, in engagement with a projection which is formed on the underside of the wheel 9 and projects down into the chamber 17. The film 19 with the cassette 20 is of a 135 (35 mm) type defined by the Industrial Standard Organization (ISO) 1007, 1979 version. Inside the cassette 20, a trailing end of the film 19 is retained on the spool 20a. The taking lenses 10a and 10b are arranged in a direction parallel with a strip of the film 19, and have optical axes 22a and 22b which are parallel to each other.

The taking lenses 10a and 10b have different focal lengths: the former has a longer focal length and is used in telephotography, whilst the latter has a shorter focal length and is used in wide-angle photography. Both telephoto and wide-angle lenses 10a and 10b are formed on a single lens plate 10 of acrylic resin. It is also possible separately to form the two taking lenses. Behind the taking lenses 10a and 10b are stationary openings 11a and 11b having an equal diameter.

Figure 3A:
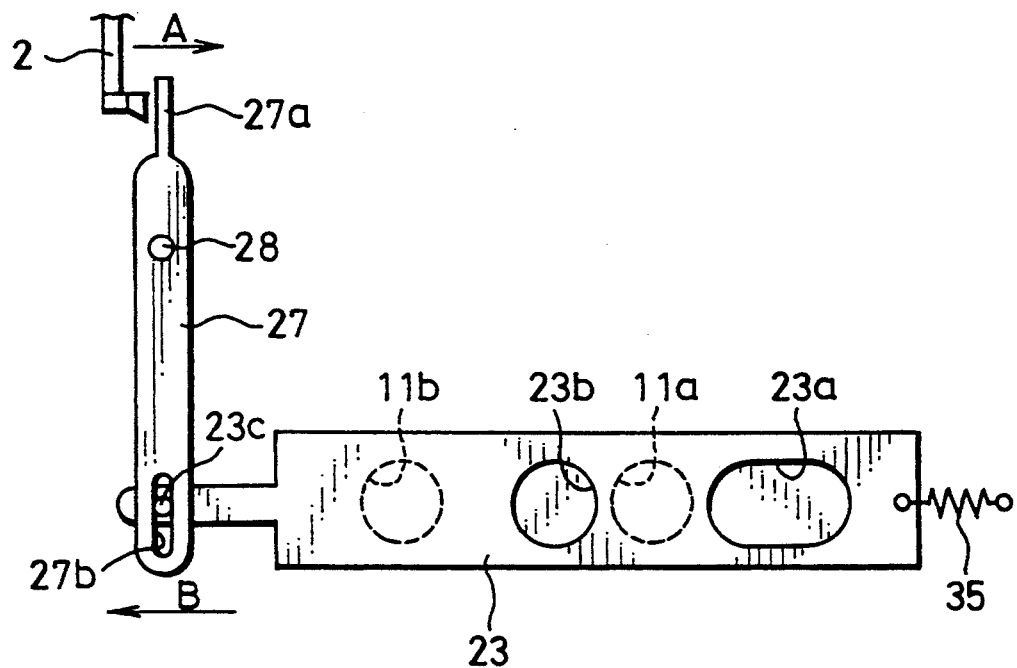
FIG. 3A is an explanatory view, in elevation, illustrating a shutter device in the film unit in its inactive condition.
Figure 3B:
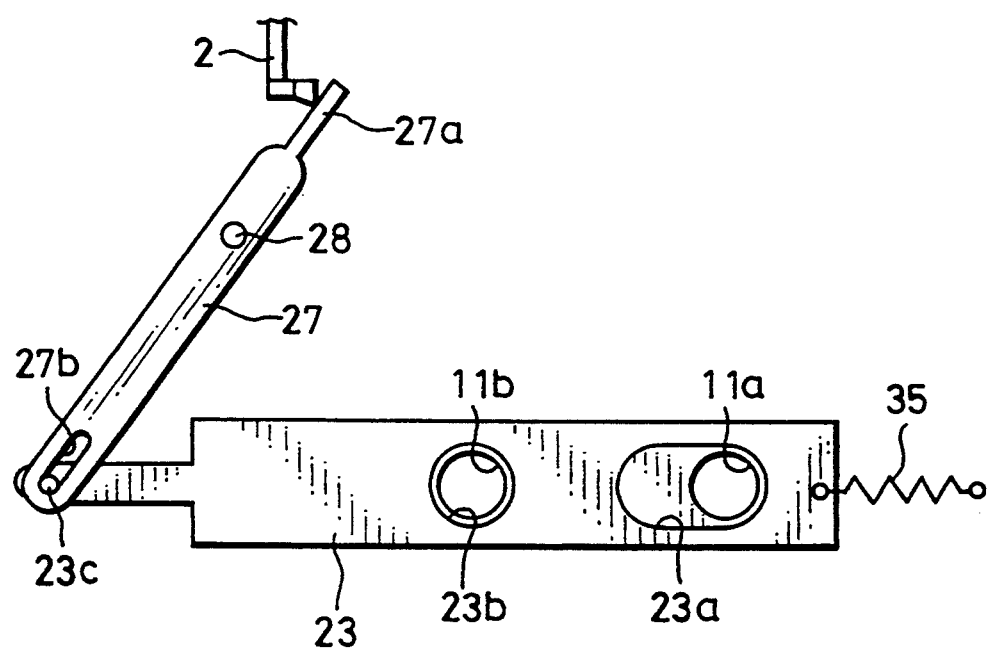
FIG. 3B is a view similar to FIG. 3A but showing a shutter device actuated.
Figure 4:
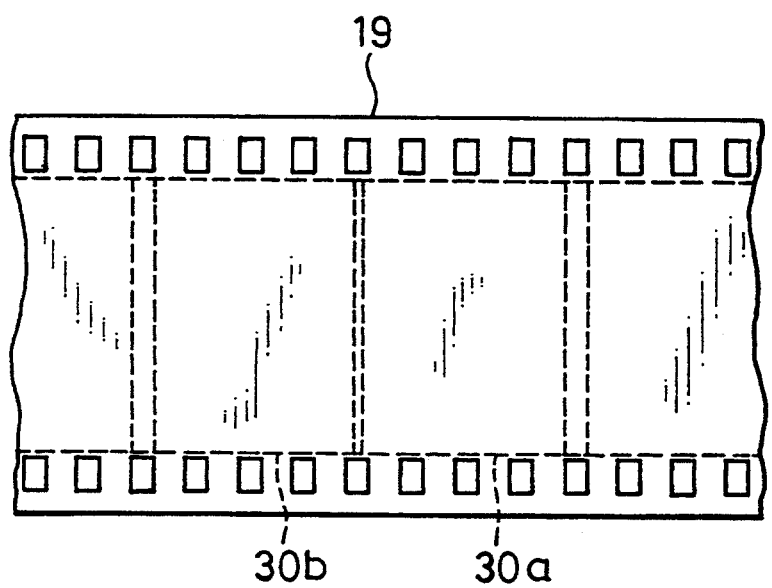
FIG. 4 is an explanatory view illustrating a pair of imaging frames created on film in the film unit of FIGS. 1 and 2.

Behind the stationary openings 11a and 11b is disposed a shutter plate 23. When the shutter button 7 is depressed, a kick-away lever 2 illustrated in FIG. 1 is swung. The lever 2 upon being swung slides the shutter plate 23 in a direction toward the cassette-containing chamber 17. As illustrated in FIGS. 3A and 3B, there are movable openings 23a and 23b formed in the shutter plate 23. The movable opening 23a associated with the longer focal length is longer than the movable opening 23b associated with the shorter focal length. With the shutter plate 23 slid, the movable openings 23a and 23b are respectively superposed on the stationary openings 11a and 11b, and this is the shutter operation of the exposure section 4. A tension spring 35 is connected to the shutter plate 23 and urges shutter plate 23 in a direction toward the supply chamber 16. The shutter plate 23, after being slid away from supply chamber 16 (FIG. 3B), is in turn slid back by the tension in spring 35 for shutter closing of the exposure section 4 (FIG. 3A). The movable openings 23a and 23b are thus moved out of registry with the stationary openings 11a and 11b, which are now closed again.

Figure 5:
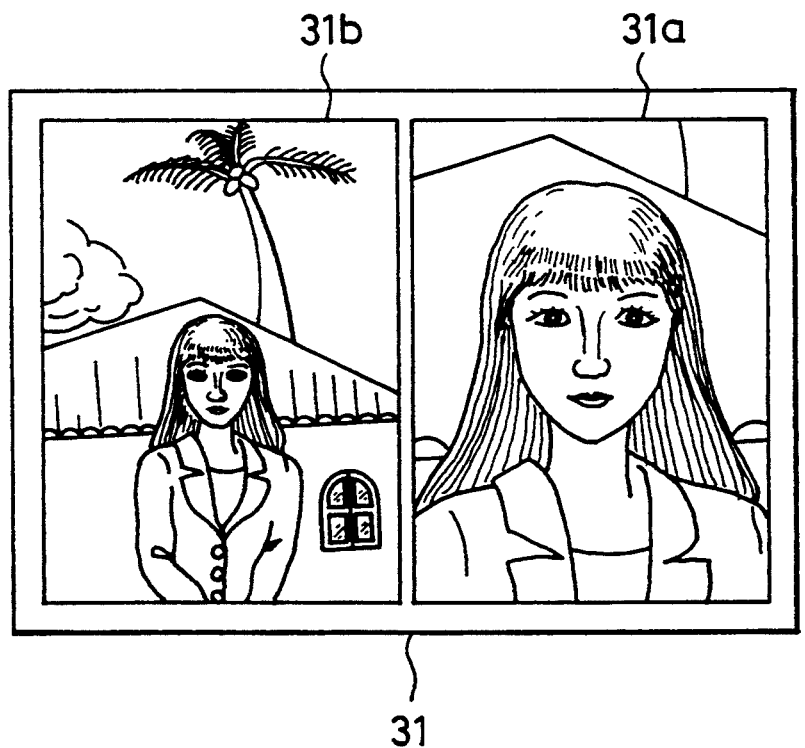
FIG. 5 is an explanatory view illustrating a print produced from the imaging frames of FIG. 4.

Although the telephoto lens 10a has a focal length longer than the wide-angle lens 10b, the lenses 10a and 10b are equally distant from the film 19 to be exposed. To form a telephoto image on the photo film 19 in sharp focus as illustrated in FIG. 5, there are two mirrors 25a and 25b disposed behind the shutter plate 23, in order to define a longer path for light from the telephoto lens 10a to the photo film 19. The combined area of the exposure apertures behind the chambers 15a and 15b lies within a single frame of the 35 mm full size. Imaging frames 30a and 30b respectively are of half size, that is, an area formed by dividing a full-size frame in two vertically.

The operation of the photographic film unit will now be described. First, the user rotates the winding wheel 9 to advance the first frame into the exposure chambers 15a and 15b. The shutter device in the exposure section 4 stands by for photography. A photographic subject is framed or targeted while being observed through the viewfinder 6. The release button 7 is depressed. As illustrated in FIG. 3A, the kick-away lever 2 is swung in the direction of arrow A. An intermediate lever 27 is biased by the spring 35 counterclockwise. The kick-away lever 2 strikes a projection 27a and rotates the intermediate lever 27 in the clockwise direction against the bias of the spring 35.

The lower end of the intermediate lever 27 has a slot 27b, which slidably receives a pin 23c projecting from the shutter plate 23. When the intermediate lever 27 is rotated clockwise, the right edge of the slot 27b presses the pin 23c to the left in the direction of arrow B, so as to slide the shutter plate 23 in the direction of arrow B. The movable openings 23a and 23b, as illustrated in FIG. 3B, are superposed on the respective stationary openings 11a and 11b. The movable opening 23a is longer than the movable opening 23b in the sliding direction of the shutter plate 23. Therefore, upon a single reciprocation of the shutter plate 23, the stationary opening 11a is opened for a longer time than the stationary opening 11b. Although the focal length differs between the lenses 10a and 10b, the exposure time the respective exposures with the lenses 10a and 10b is appropriately adjusted, so as to adjust the exposure value to be suitable for the different focal lengths.

The subject light entering through the telephoto lens 10a passes through the stationary opening 11a, is reflected by the mirrors 25a and then 25b, and is focused on the film 19 to make an exposure on the imaging frame 30a. The subject light entering through the wide-angle lens 10b passes through the stationary opening 11b, and is focused on the film 19 to make an exposure of the imaging frame 30b. The two imaging frames 30a and 30b are disposed horizontally side by side.

An exposure is thus completed. To prepare for the next exposure, winding wheel 9 is rotated again. The portion of the film containing the exposed imaging frames 30a and 30b is thus transported and is wound back into the cassette 20, so as to position behind the exposure chambers 15a and 15b an unexposed portion of the film 19 that has been drawn out of the roll 21. Repeated exposure operations in the same manner use up the film 19, whereupon "0" is indicated on the counter wheel 8 inside the associated window. The photographer, without unloading of the film, forwards the entirety of the film unit to a photographic finishing agent, which removes and develops the film and produces photo prints 31 as illustrated in FIG. 5.

Each photo print 31 has two simultaneously taken pictures 31a and 31b of an identical subject. The telephoto picture 31a, made by use of the telephoto lens 10a, is located on the right. The size of the principal subject is much enlarged. The wide-angle picture frame 31b, made by use of the wide-angle lens 10b, is located on the left. A wide photographic field surrounding the principal subject is recorded on frame 31b.

Figure 6:
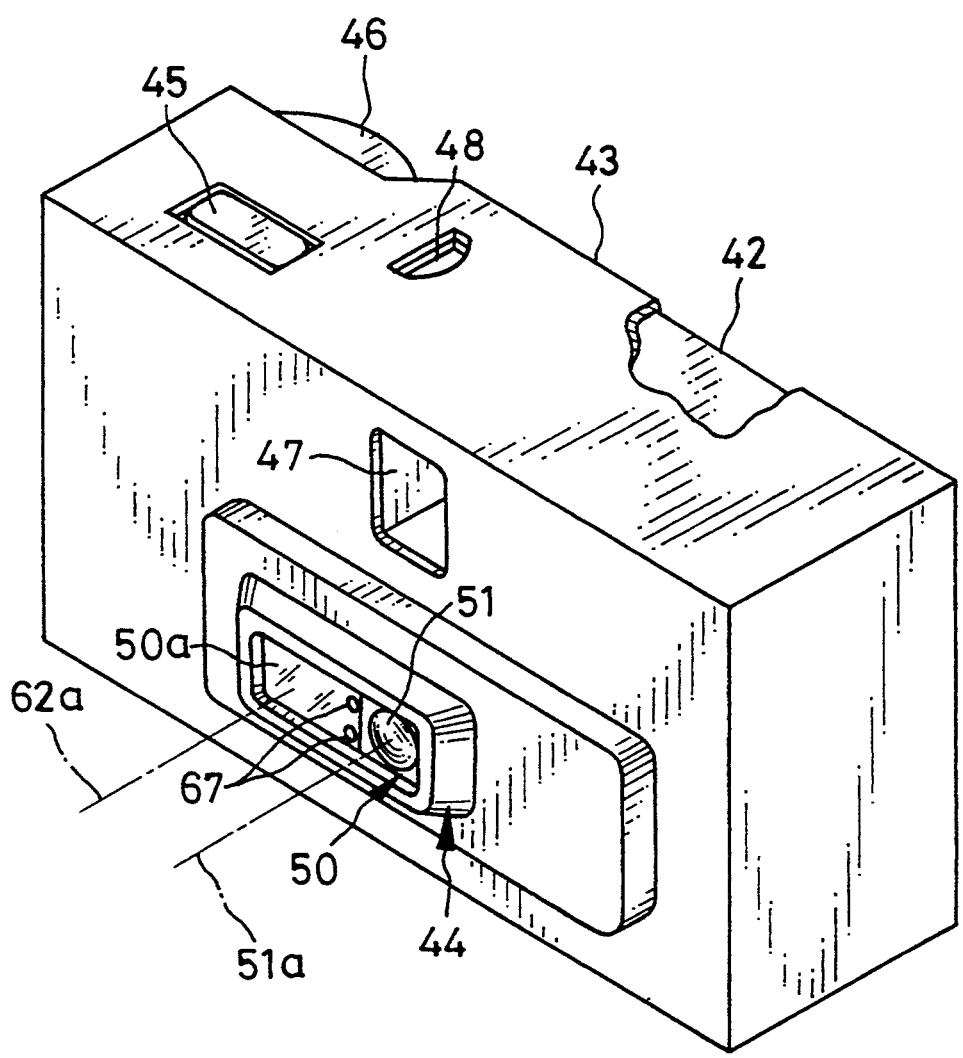
FIG. 6 is a perspective view illustrating a different film unit in which a shutter plate is protected reliably.

FIG. 6 illustrates a preferred embodiment in which the front of shutter plate 64 is protected reliably. Elements similar to those of the above embodiment are designated with the identical reference numerals. A film housing 42 is covered in a cardboard packaging 43, which has openings for an exposure section 44, a depressible shutter button portion 45, a winding wheel 46, a viewfinder 47 and a counter window 48. There is a transparent lens plate 50 of resin disposed in the exposure section 44. The lens plate 50 includes a telephoto lens 51 having a focal length of 65 mm, for example, and a flat portion 50a having opposite flat parallel faces.

Figure 7:
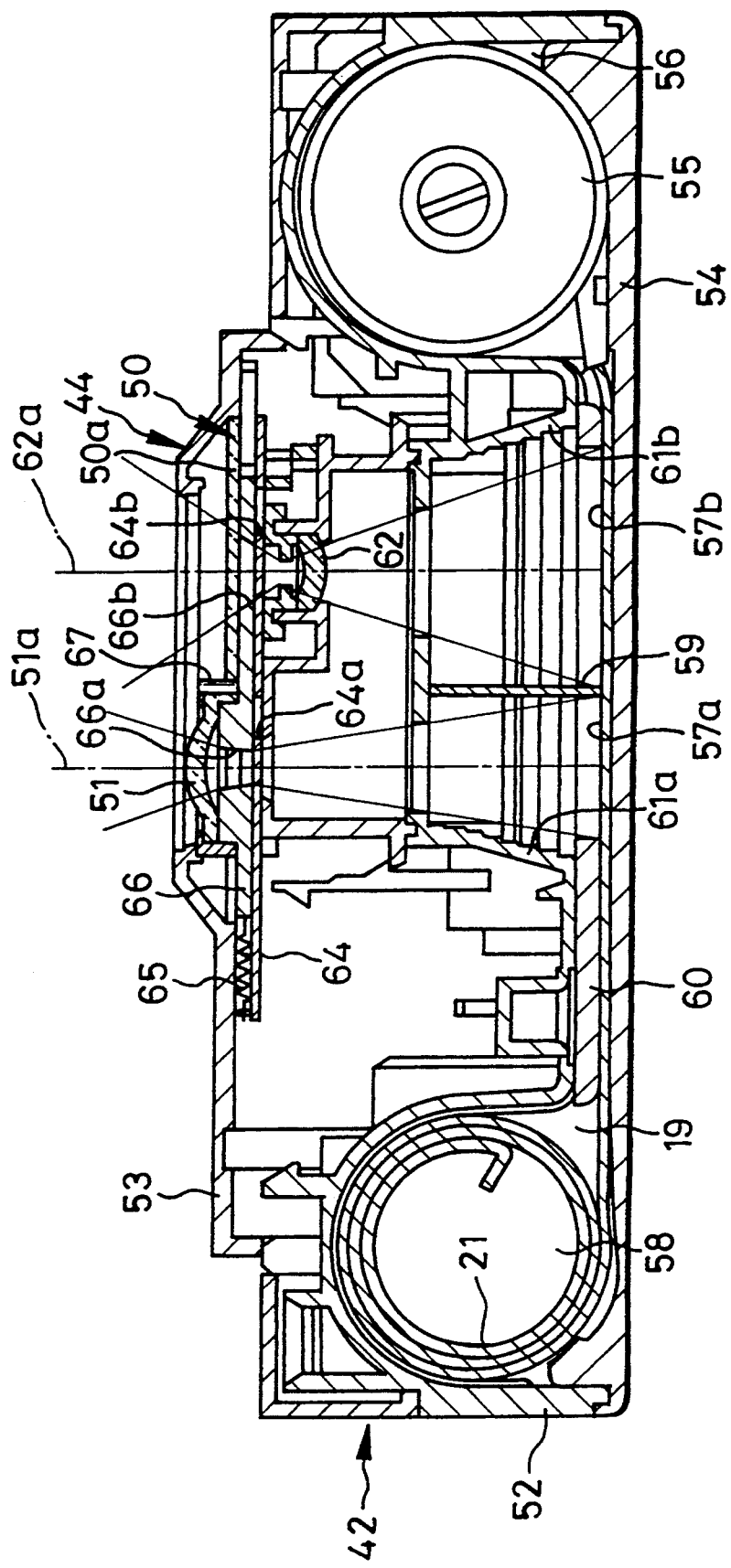
FIG. 7 is a horizontal section illustrating the photographic film unit of FIG. 6.

In FIG. 7, a partition 59 separates an exposure station 60 into two exposure chambers 61a and 61b terminating rearwardly in exposure apertures, which together have the 35 mm full size. Reference numeral 52 designates a main body, 53 a front cover, 54 a rear cover, 56 a cassette-containing chamber, and 58 a film supply chamber.

In front of the exposure chamber 61b is disposed a wide-angle lens 62 having a focal length of 32 mm for example. The shutter plate 64 is disposed in front of the lens 62. Reference numerals 64a and 64b designate openings in plate 64 that are accordingly movable with plate 64, and 51a and 62a designate the respective optical axes of lens 51 and 62.

A tension spring 65 biases the shutter plate 64 toward the cassette-containing chamber 56. In an ordinary state, the shutter plate 64 is maintained under the bias of the spring 65 in a position to close the stationary openings 66a and 66b associated with the taking lenses 51 and 62. In response to a release of the shutter device, a kick-away lever (see FIGS. 1, 3A and 3B) slides the shutter plate 64 toward the film supply chamber 58. The movable openings 64a and 64b are moved to register with the optical axes 51a and 62a simultaneously. Then the kick-away lever is disengaged from the shutter plate 64, which is returned by the spring 65 to the initial position, to terminate the exposure.

In front of the shutter plate 64, a shutter cover 66 is disposed on the main body 52 to cover the shutter plate 64. The shutter cover 66 has not only the stationary openings 66a and 66b but also two pins 67 formed thereon. The lens plate 50 is mounted in front of the shutter cover 66. The pins 67 are received in holes in the lens plate 50, so as to position the lens plate 50 precisely on the shutter cover 66. The telephoto lens 51 is positioned exactly in front of the stationary opening 66a. The stationary openings 66a and 66b are thus enclosed tightly by the lens plate 50 and protected from external dirt.

To assemble the unit, the main body 52 is provided with the above wide-angle lens 62, the shutter plate 64, the shutter cover 66, and the lens plate 50. Then the front cover 53 is secured to the main body 52 to cover the front, that is, to cover exposure section 44. The rear cover 54 is also secured behind the main body 52, and covers the rear of the film 19, the cassette-containing chamber 56 and the film supply chamber 58 in light-tight fashion.

The subject light entering through the telephoto lens 51 passes through the stationary opening 66a, and is focused on the film 19 to make an exposure on a smaller imaging frame 57a. The subject light at the same time passes through the stationary opening 66b and through the wide-angle lens 62, and is focused on the film 19 to make an exposure on a larger imaging frame 57b. The two imaging frames 57a and 57b are horizontally aligned. The combined area of the two imaging frames 57a and 57b constitutes a single frame of the 35 mm full size. Each photo print has two picture frames simultaneously exposed. A smaller telephoto picture frame is located on one side. A larger wide-angle picture frame is located on the other side.

The flat portion 50a is formed as extension of the lens plate 50, and overlies the wide-angle photographing system including the stationary opening 66b, the shutter plate 64, and the movable opening 64b. It is advantageous that all of those be protected by a simple construction of the flat portion 50a. The shutter plate 64 is thus not exposed to dirt or other external matter, and can be stably actuated without being influenced externally. There is no danger of damage to or accidental deformation of the shutter plate 64.

In the above embodiments, the telephoto lens 51 is disposed in front of the shutter plate 64, while the wide-angle lens 62 is disposed behind the shutter plate 64. This is an advantage for simplifying the exposure section 44 having the shutter device, in association with the telephoto and wide-angle lenses 51 and 62 requiring different dispositions relative to the film 19 so that both will be in focus.

Figure 8:
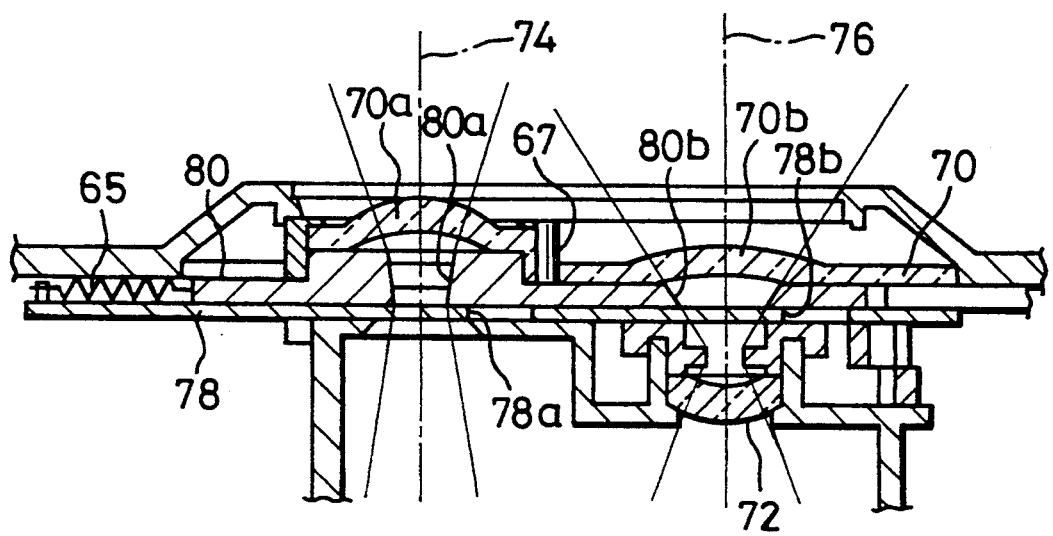
FIG. 8 is a fragmentary horizontal section illustrating another preferred exposure section of a photographic film unit in which an auxiliary lens is used.

FIG. 8 illustrates another preferred lens plate 70, on which an auxiliary lens 70b is formed. A telephoto lens 70a is formed on the lens plate 70, and focuses a subject image on the film 19 for telephotography. The combination of an inner lens 72 and the auxiliary lens 70b constitutes a lens system, which focuses the subject image on the film 19 for wide-angle photography. This construction is also advantageous in that the wide-angle lens system can have a still shorter focal length relative to the telephoto lens 70a. Note that reference numerals 74 and 76 designate the optical axes of the taking lenses, 78 a shutter plate, 78a and 78b movable openings, 80 a shutter cover, and 80a and 80b stationary openings in the shutter cover 80.

In the above embodiments, the subject light passing through the telephoto lens 51 or 70a falls directly on the film 19 in the telephoto exposure chamber 61a. Alternatively, there may be arranged two mirrors for elongating the light path from the telephoto lens to the film 19, as in the embodiment in FIG. 1. As was pointed out above, in FIG. 1 the subject light entering through the telephoto lens is reflected by a first mirror 25a laterally, then reflected by the second mirror 25b in turn toward the film 19, and is focused on the film 19 to make an exposure on a telephoto imaging frame.

In the above embodiments, the lens plate 50 or 70 is mounted and positioned on the main body 52, before the front cover 53 is secured to the main body 52. Alternatively, a lens plate may be mounted and positioned on the rear of the front cover 53 before the securing to the main body 52.

In the above embodiments, the lens plate 50 or 70 has a central stepped portion between the telephoto lens 51 or 70a and either of the flat portion 50a and the auxiliary lens 70b, in order to locate the telephoto lens 51, 70a on a level projected toward the front to have a sufficient distance from the film 19 relative to the flat portion 50a or the auxiliary lens 70b. Alternatively, the lens plate may lack such a stepped portion, and may include a telephoto lens and a flat portion or an auxiliary lens formed flush thereon.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A lens-fitted photographic film unit pre-loaded with photographic film, provided with first and second exposure chambers, and adapted to create first and second imaging frames simultaneously on said film, said film unit comprising:

first and second stationary openings formed respectively in front of said first and second exposure chambers for introducing light into said first and second exposure chambers;

externally operable shutter release means;

a single shutter plate disposed to be moved in response to operation of said release means;

first and second movable openings formed in said shutter plate for registry with said first and second stationary openings, and adapted, when said shutter plate is moved, to open or close said stationary openings so as to expose said film;

a first taking lens disposed behind said shutter plate, in registry with said first stationary opening and having a first focal length; and a transparent lens plate disposed in front of said shutter plate to cover said shutter plate, and provided with a second taking lens in registry with said second stationary opening and having a second focal length greater than said first focal length.

2. A lens-fitted photographic film unit as defined in claim 1, wherein a portion of said lens plate located in front of said first movable opening, and is provided with an auxiliary lens formed thereon that is disposed on an optical axis of said first lens.

3. A lens-fitted photographic film unit as defined in claim 1, which further comprises:

a body containing said photographic film and incorporating said release means and said shutter plate; and a front cover secured in front of said body, said first lens and said lens plate being mounted between said front cover and said body.

4. A lens-fitted photographic film unit as defined in claim 1, wherein said lens plate is of resin.

5. A lens-fitted photographic film unit as defined in claim 1, wherein said lens plate has a stepped portion located between said second lens and a covering portion of said lens plate disposed in front of said first movable opening, and said stepped portion projects said second lens toward a front from said covering portion.

6. A lens-fitted photographic film unit as defined in claim 1, further comprising a shutter cover disposed in front of said shutter plate for covering said shutter plate, said lens plate being mounted in front of said shutter cover.

7. A lens-fitted photographic film unit as defined in claim 1, wherein said first and second lenses are arranged in a transport direction of said film, and said shutter plate slides in said transport direction.

8. A lens-fitted photographic film unit as defined in claim 1, wherein said second frame is smaller in size than said first frame on said film.

9. A lens-fitted photographic film unit as defined in claim 1, further comprising:

a first mirror disposed behind said second lens for reflecting said light passing through said second lens, to direct said light away from said first lens; and a second mirror disposed in front of said film for reflecting said light reflected by said first mirror, to direct said light to said film.

* * * * *